US012617934B2

(12) United States Patent
Knerr

(10) Patent No.: US 12,617,934 B2
(45) Date of Patent: May 5, 2026

(54) LOW NOISE BIODEGRADABLE BREATHABLE FILMS

(71) Applicant: OMYA INTERNATIONAL AG, Oftringen (CH)

(72) Inventor: Michael Knerr, Oftringen (CH)

(73) Assignee: OMYA INTERNATIONAL AG, Oftringen (CH)

( * ) Notice: Subject to any disclaimer, the term of this patent is extended or adjusted under 35 U.S.C. 154(b) by 629 days.

(21) Appl. No.: 18/002,891

(22) PCT Filed: Jul. 2, 2021

(86) PCT No.: PCT/EP2021/068310
§ 371 (c)(1),
(2) Date: Dec. 22, 2022

(87) PCT Pub. No.: WO2022/003150
PCT Pub. Date: Jan. 6, 2022

(65) Prior Publication Data

US 2023/0257555 A1 Aug. 17, 2023

(30) Foreign Application Priority Data

Jul. 3, 2020 (EP) .................................... 20184053

(51) Int. Cl.

| | |
|---|---|
| ***C08K 9/04*** | (2006.01) |
| ***C08J 5/18*** | (2006.01) |
| ***C08K 5/092*** | (2006.01) |
| *C08K 3/26* | (2006.01) |

(52) U.S. Cl.
CPC .................. *C08K 9/04* (2013.01); *C08J 5/18* (2013.01); *C08K 5/092* (2013.01); *C08J 2300/16* (2013.01); *C08J 2367/02* (2013.01); *C08J 2367/04* (2013.01); *C08J 2467/02* (2013.01); *C08J 2467/04* (2013.01); *C08K 2003/265* (2013.01)

(58) Field of Classification Search
CPC .... C08K 9/04; C08K 5/092; C08K 2003/265; C08K 3/26; C08K 5/09; C08J 5/18; C08J 2300/16; C08J 2367/02; C08J 2467/02; C08J 2467/04; C01P 2004/51; C01P 2004/61; C01P 2004/62; C01P 2006/12; C01P 2006/82; C09C 3/08; C09C 1/021
USPC .......................................................... 523/206
See application file for complete search history.

(56) References Cited

U.S. PATENT DOCUMENTS

| | | | | |
|---|---|---|---|---|
| 4,107,364 | A | 8/1978 | Sisson | |
| 4,834,741 | A | 5/1989 | Sabee | |
| 5,143,679 | A | 9/1992 | Weber et al. | |
| 5,156,793 | A | 10/1992 | Buell et al. | |
| 5,167,897 | A | 12/1992 | Weber et al. | |
| 6,660,211 | B2 | 12/2003 | Topolkaraev et al. | |
| 8,466,337 | B2 | 6/2013 | Wang et al. | |
| 10,941,279 | B2 * | 3/2021 | Brunner | C08L 23/12 |
| 2001/0051692 | A1 * | 12/2001 | Kanamori | C08L 67/04 525/411 |
| 2002/0098341 | A1 | 7/2002 | Schiffer et al. | |
| 2005/0112363 | A1 | 5/2005 | Ning | |
| 2007/0037912 | A1 * | 2/2007 | Mohanty | C08J 5/18 524/445 |
| 2010/0068484 | A1 | 3/2010 | Kaufman | |
| 2011/0244185 | A1 | 10/2011 | Dou et al. | |
| 2012/0031576 | A1 | 2/2012 | Gane et al. | |
| 2015/0322246 | A1 | 11/2015 | Broyles et al. | |

FOREIGN PATENT DOCUMENTS

| | | | |
|---|---|---|---|
| CN | 102250455 | A | 11/2011 |
| EP | 2070991 | A1 | 6/2009 |
| EP | 2264108 | A1 | 12/2010 |
| EP | 2264109 | A1 | 12/2010 |
| EP | 2722368 | A1 | 4/2014 |
| EP | 2975078 | A1 | 1/2016 |
| EP | 3272799 | A1 | 1/2018 |
| EP | 3572456 | A1 | 11/2019 |
| WO | 2009/074492 | A1 | 6/2009 |

OTHER PUBLICATIONS

International Search Report from PCT/EP2021/068310, mailed Sep. 21, 2021, 5 pages.
Written Opinion from PCT/EP2021/068310, mailed Sep. 21, 2021, 6 pages.
CN102250455A English-language abstract from Espacenet, 2011 (1 page).

* cited by examiner

*Primary Examiner* — Hannah J Pak
(74) *Attorney, Agent, or Firm* — ALGM LLP; Harry J. Guttman

(57) ABSTRACT

The present invention relates to a breathable film comprising at least one biodegradable polymer, a process for producing the breathable film, the use of a surface-treated filler material product as filler in the breathable film, an article comprising the breathable film as well as the use of the breathable film in hygienic applications, medical applications, healthcare applications, filtration materials, geotextile products, agricultural applications, horticultural applications, clothing, footwear products, baggage products, household applications, industrial applications, packaging applications, building applications, or construction.

25 Claims, No Drawings

LOW NOISE BIODEGRADABLE BREATHABLE FILMS

The present invention relates to a breathable film comprising at least one biodegradable polymer, a process for producing the breathable film, the use of a surface-treated filler material product as filler in the breathable film, an article comprising the breathable film as well as the use of the breathable film in hygienic applications, medical applications, healthcare applications, filtration materials, geotextile products, agricultural applications, horticultural applications, clothing, footwear products, baggage products, household applications, industrial applications, packaging applications, building applications, or construction.

The first breathable films for hygiene products were developed as early as 1983 in Japan. Production of breathable films began in the USA in the mid 1990s and later in Europe, where they rapidly commanded a large market share. Currently, breathable films have two main fields of application: personal hygiene products, such as infant diapers, feminine hygiene pads (napkins, panty liners) or adult incontinence products, and construction industry, such as under-roofing membranes, house wraps or wall coverings. However, the specific permeability properties of these films also have uses in other industries, such as disposable clothing in medical and industrial applications.

Breathable films typically comprise a blend of thermoplastic polymers and an inorganic filler such as calcium carbonate and are produced by forming a film from said blend by casting or blowing with subsequent stretching of the film. The stretching process delaminates the polymer from the surface of the inorganic filler particles, which produces micropores, often referred to as “voids” in the film’s cross section, which allows the passage of water vapour during end-use.

However, such films are consumed in multitude and are disposed after use such that it is desirable to use compostable or biodegradable sheets for environmental reasons. Therefore, is desired to produce films which are compostable or biodegradable but without compromising the performance. Such films are well known in the art. For example, US20020098341 refers to a biodegradable breathable film formed by mixing any biodegradable polymer with particles and subsequent stretching. US20100068484 refers to a breathable biodegradable film with two kinds of filler particles of different size. CN102250455 refers to a breathable biodegradable film made from polylactic acid (PLA) and 40-60% calcium carbonate and 1-10% of other auxiliary agents. U.S. Pat. No. 6,660,211 refers to a biodegradable breathable film made with biodegradable film and water soluble polymer which dissolves and creates porosity. US20050112363 refers to a biodegradable breathable film comprising a biodegradable polyester, a biodegradable copolyester and filler. U.S. Pat. No. 8,466,337 refers to a biodegradable breathable film comprising thermoplastic starch, PBAT and filler.

However, such biodegradable breathable films typically based on polylactic acid (PLA) provide good mechanical properties but create unpleasant noise in the end product. This would be irritating for the end consumer and is thus not wanted. Other soft polymers such as vinyl acetate copolymers or PBS do not create such noise but have low stiffness, which is then difficult to handle in the film processing, e.g. in the printing and lamination step. Furthermore, it is desired that the film allows sufficient vapour transmission properties, i.e. is breathable, as the non-evaporation of moisture may lead to skin irritations when used e.g. in hygiene products such as diapers.

Thus, the provision of biodegradable breathable films providing low noise and having good mechanical properties remains of interest to the skilled man.

Accordingly, it is an object of the present invention to provide a breathable film which is biodegradable and provides low noise. It would also be desirable to provide a breathable film having good mechanical properties such as force at break, elongation at break or modulus of elasticity. It would also be desirable to provide a breathable film which retains good breathability and low film defect levels. It would also be desirable to provide a breathable film with good processing characteristics such as low die build-up properties.

The foregoing objects and other objects are solved by the subject-matter as defined herein in the independent claims. Advantageous embodiments of the present invention are defined herein and also in the corresponding sub-claims.

According to one aspect of the present invention, a breathable film comprising at least one biodegradable polymer is provided. The breathable film comprises at least one biodegradable polymer and from 35 to 65 wt.-%, based on the total weight of the breathable film, of a surface-treated filler material product, wherein the surface-treated filler material product comprises A) at least one ground calcium carbonate-comprising filler material having
   a weight median particle size $d_{50}$ in the range from 0.1 μm to 7 μm,
   a top cut particle size $d_{98}$ of ≤15 μm,
   a specific surface area (BET) from 0.5 to 150 $m^2/g$, as measured using nitrogen and the BET method according to ISO 9277, and
   a residual total moisture content in the range from 0.05 to 0.3 wt.-%, based on the total dry weight of the at least one ground calcium carbonate-comprising filler material B) a treatment layer on the surface of the at least one ground calcium carbonate-comprising filler material comprising
   i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or
   ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material, and wherein the at least one biodegradable polymer has a tensile E-modulus, measured according to ISO 527-3, of below 2100 MPa.

According to one embodiment, the at least one ground calcium carbonate-comprising filler material is a wet ground calcium carbonate-comprising filler material According to another embodiment, the at least one biodegradable polymer is selected from the group comprising polylactic acid, polylactic acid-based polymer, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly (3-hydroxybutyrate-co-3-hydroxyvalerate); polybutyrate-adipate-terephthalate (PBAT), polyglyconate, poly(dioxanone), polybutylene succinate (PBS), polycaprolactone (PCL), polycaprolactone-poly(ethylene glycol) copolymer, polycaprolactone-polylactic acid copolymer, polyvinylalcohol (PVA), poly(ethylene succinate) (PES), poly(propylene succinate) (PPS), and mixtures thereof, preferably polylactic acid, polylactic acid-based polymer, polybutyrate-adipate-terephthalate (PBAT), and mixtures thereof.

According to yet another embodiment, the at least one biodegradable polymer is a blend of polybutyrate-adipate-terephthalate (PBAT) and polylactic acid, preferably in a weight ratio ranging from 10:1 to 1:9, more preferably in a weight ratio ranging from 10:1 to 2:1.

According to one embodiment, the breathable film comprises the surface-treated filler material product in an amount from 40 to 65 wt.-%, based on the total weight of the breathable film, preferably from 40 to 60 wt.-%, and most preferably from 40 wt.-% to 55 wt.-%.

According to another embodiment, the at least one ground calcium carbonate-comprising filler material is natural ground calcium carbonate, precipitated calcium carbonate, modified calcium carbonate, surface-treated calcium carbonate, or a mixture thereof, and preferably natural ground calcium carbonate.

According to yet another embodiment, the at least one ground calcium carbonate-comprising filler material has a) a weight median particle size $d_{50}$ from 0.25 μm to 5 μm, preferably from 0.5 μm to 4 μm, and most preferably from 0.6 μm to 2 μm, and/or b) a top cut particle size $d_{98}$ of ≤12.5 μm, preferably of ≤10 μm, more preferably of ≤7.5 μm and most preferably of ≤6.5 μm, and/or c) a fineness such that at least 5 wt.-%, preferably at least 7 wt.-%, even more preferably at least 9 wt.-% and most preferably at least 11 wt.-% of all particles have a particle size of <0.5 μm, and/or d) a specific surface area (BET) of from 0.5 to 50 $m^2/g$, more preferably of from 0.5 to 35 $m^2/g$, and most preferably of from 0.5 to 15 $m^2/g$, as measured using nitrogen and the BET method according to ISO 9277.

According to one embodiment, the at least one ground calcium carbonate-comprising filler material has a residual total moisture content of from 0.05 to 0.2 wt.-%, preferably from 0.05 to 0.15 wt.-%, and most preferably from 0.05 to 0.15 wt.-%, based on the total dry weight of the at least one ground calcium carbonate-comprising filler material.

According to another embodiment, the treatment layer on the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from at least C4 to C18 in the substituent and/or salts thereof.

According to yet another embodiment, the surface-treated filler material product has a moisture pick-up from 0.1 to 1 mg/g, preferably from 0.2 to 0.9 mg/g, and most preferably from 0.2 to 0.8 mg/g, at a temperature of 23° C. (±2° C.).

According to one embodiment, the film has a basis weight from 8 to 40 $g/m^2$, preferably from 15 to 38 $g/m^2$, and most preferably from 20 to 36 $g/m^2$.

According to a further aspect, a process for producing a breathable film comprising at least one biodegradable polymer and from 35 to 65 wt.-%, based on the total weight of the breathable film, of a surface-treated filler material product is provided, the process comprising the steps of:

a) providing a composition comprising at least one biodegradable polymer band from 35 to 65 wt.-%, based on the total weight of the composition, of a surface-treated filler material product, wherein the at least one biodegradable polymer has a tensile E-modulus, measured according to ISO 527-3, of below 2100 MPa, and b) forming a film from the composition of step a), and c) stretching the film obtained in step b) into at least one direction, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 $m^2/g$, as measured using nitrogen and the BET method according to ISO 9277, and a residual total moisture content in the range from 0.05 to 0.3 wt.-%, based on the total dry weight of the at least one ground calcium carbonate-comprising filler material, and B) a treatment layer on the surface of the at least one ground calcium carbonate-comprising filler material comprising i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material According to one embodiment, the composition provided in step a) is a masterbatch or a compound obtained by mixing and/or kneading the at least one biodegradable polymer and the surface-treated filler material product to form a mixture and continuously pelletizing the obtained mixture.

According to still another aspect of the present invention, the use of a surface-treated filler material product as filler in a breathable film comprising at least one biodegradable polymer, wherein the breathable film comprises the surface-treated filler material product in an amount from 35 to 65 wt.-%, based on the total weight of the breathable film, is provided, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 $m^2/g$, as measured using nitrogen and the BET method according to ISO 9277, and a residual total moisture content in the range from 0.05 to 0.3 wt.-%, based on the total dry weight of the at least one ground calcium carbonate-comprising filler material, and B) a treatment layer on the surface of the at least one ground calcium carbonate-comprising filler material comprising i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material, wherein the at least one biodegradable polymer has a tensile E-modulus, measured according to ISO 527-3, of below 2100 MPa According to still another aspect of the present invention, an article comprising a breathable film comprising at least one biodegradable polymer and from 35 to 65 wt.-%, based on the total weight of the breathable film, of a surface-treated filler material product as defined herein is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

According to still another aspect of the present invention, a use of a breathable film comprising at least one biodegradable polymer and from 35 to 65 wt.-%, based on the total weight of the breathable film, of a surface-treated filler material product as defined herein in hygienic applications, medical applications, healthcare applications, filtration materials, geotextile products, agricultural applications, horticultural applications, clothing, footwear products, baggage products, household applications, industrial applications, packaging applications, building applications, or construction is provided.

It should be understood that for the purposes of the present invention, the following terms have the following meanings:

The term "ground calcium carbonate-comprising filler" in the gist of the present invention means a calcium carbonate-comprising filler which has been manufactured by a process including at least one grinding step. "Ground calcium carbonate-comprising fillers may be "wet ground" or "dry ground", wherein a "wet ground calcium carbonate-comprising filler" in the meaning of the present invention is a ground calcium carbonate comprising filler which has been manufactured by a process including at least one grinding step in aqueous suspension with a solids content between 20 and 80 wt.-% and a "dry ground calcium carbonate-comprising filler" is a ground calcium carbonate comprising filler which has been manufactured by a process including at least one grinding step in aqueous suspension with a solids content of more than 80 and up to 100 wt.-%.

The term "breathable film" in the meaning of the present invention refers to a polymer film that allows the passage of gases and moisture vapour, for example, due to the presence of micropores. The "breathability" of a breathable film can be measured by its water vapour transmission rate (WVTR), which is specified in g/($m^2$-day). For example, a polymer film may considered as being "breathable" if it has a WVTR of at least 800 g/($m^2$-day). The WVTR may be determined with a Lyssy L80-5000 measuring device according to ASTM E398.

The term "biodegradable" in the meaning of the present invention refers to a polymer that is capable of being broken down into water, carbon dioxide and biomass and disposed of with the help of bacteria or other living organisms. Preferably, the at least one biodegradable polymer is biodegradable in the sense of ISO 13432.

A "film" in the meaning of the present invention is a sheet or layer of material having a median thickness which is small compared to its length and width. For example, the term "film" may refer to a sheet or layer of material having a basis weight (or film grammage) from 1 to 500 g/$m^2$. Preferably, the film has a basis weight from 8 to 40 g/$m^2$, preferably from 15 to 38 g/$m^2$, and most preferably from 20 to 36 g/$m^2$.

For the purpose of the present invention, the term "calcium carbonate-comprising filler material" refers to a material that comprises at least 80 wt.-% calcium carbonate, based on the total dry weight of the calcium carbonate-comprising filler material.

"Natural ground calcium carbonate" (GCC) in the meaning of the present invention is a calcium carbonate obtained from natural sources, such as limestone, marble, dolomite or chalk, and processed through a wet treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US20120031576 A1, WO2009074492 A1, EP2264109 A1, EP2070991 A1, or EP2264108 A1.

The term "surface-treated filler material product" in the meaning of the present invention refers to a calcium carbonate-comprising filler material which has been contacted with a surface treatment agent such as to obtain a coating layer on at least a part of the surface of the calcium carbonate-comprising filler material.

The term "dry" calcium carbonate-comprising filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

The term "polymer masterbatch" (=or "masterbatch") relates to a composition with a relative high filler content, preferably at least or equal to 60 wt.-% (based on the total weight of the composition). A "polymer masterbatch" may be added to an unfilled or lowly filled polymer during processing in order to achieve higher filler contents. Nevertheless, a "polymer composition" (=or "composition") as defined earlier having a relative low filler content, preferably below 60 wt.-% (based on the total weight of the composition), and which often also referred to as a "polymer compound" (=or "compound"), may also be used directly in the production of a polymer product.

The term "polymer composition" refers to a composite material comprising at least one additive (e.g., at least one filler) and at least one polymer material which may be used in the production of a polymer product. Accordingly, the term "polymer composition" (=composition) as used herein comprises both, "polymer masterbatches" and "polymer compounds".

The "particle size" of particulate materials is described herein by its weight-based distribution of particle sizes dx. Therein, the value dx represents the diameter relative to which x % by weight of the particles have diameters less than dx. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$ (wt) unless indicated otherwise. Particle sizes were determined by using a Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$.

The "specific surface area" (expressed in $m^2/g$) of a material as used throughout the present document can be determined by the Brunauer Emmett Teller (BET) method with nitrogen as adsorbing gas and by use of an ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained.

For the purpose of the present invention, the "solids content" of a liquid composition is a measure of the amount of material remaining after all the solvent or water has been evaporated.

A "suspension" or "slurry" in the meaning of the present invention comprises insoluble solids and water, and optionally further additives, and usually contains large amounts of solids and, thus, is more viscous and can be of higher density than the liquid from which it is formed.

A "treatment layer" in the gist of the present invention refers to a layer, preferably a monolayer of a surface treatment agent on the surface of the at least one ground calcium carbonate-comprising filler material. The "treatment layer" comprises as surface treatment agent i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive breathable film comprises at least one biodegradable polymer and from 35 to 65 wt.-%, based on the total weight of the breathable film, of a surface-treated filler material product. The surface-treated filler material product comprises A) at least one ground calcium carbonate-comprising filler material having—a weight median particle size $d_{50}$ in the range from 0.1 μm to 7 μm, a top cut particle size $d_{98}$ of ≤15 μm,—a specific surface area (BET) from 0.5 to 150 $m^2/g$, as measured using nitrogen and the BET method according to ISO 9277, and—a residual total moisture content in the range from 0.05 to 0.3 wt.-%, based on the total dry weight of the at least one ground calcium carbonate-comprising filler material, B) a treatment layer on the surface of the at least one ground calcium carbonate-comprising filler material comprising i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material. Further, the at least one biodegradable polymer has a tensile E-modulus, measured according to ISO 527-3, of below 2100 MPa.

In the following details and preferred embodiments of the inventive product will be set out in more detail. It is to be understood that these technical details and embodiments also apply to the inventive process for producing said breathable film and the inventive use of the breathable film and the surface-treated filler material product.

Biodegradable Polymer

The breathable film of the present invention comprises at least one biodegradable polymer. It is appreciated that the at least one biodegradable polymer is not restricted to a specific material as long as the polymer is suitable for the preparation of a breathable film and has a tensile E-modulus, measured according to ISO 527-3, of below 2100 MPa.

Preferably, the at least one biodegradable polymer has a tensile E-modulus, measured according to ISO 527-3, of below 1700 MPa, more preferably of below 1500 MPa, even more preferably of below 1000 MPa and most preferably of below 700 MPa. It is appreciated that there is no lower limit for the tensile E-modulus as long as the at least one biodegradable polymer provides sufficient film processing properties. For example, the at least one biodegradable polymer has a tensile E-modulus, measured according to ISO 527-3, of more than 10 MPa, more preferably of more than 20 MPa, even more preferably of more than 25 MPa and most preferably of more than 30 MPa.

In a specifically preferred embodiment, the at least one biodegradable polymer has a tensile E-modulus, measured according to ISO 527-3, of below 100 MPa, e.g. in a range from 10 to 100 MPa, preferably in a range from 20 to 100 MPa, more preferably in a range from 25 to 100 MPa and most preferably in a range from 30 to 100 MPa.

It is appreciated that the expression "at least one" biodegradable polymer means that the biodegradable polymer comprises, preferably consists of, one or more kinds of biodegradable polymer(s).

Accordingly, it should be noted that the at least one biodegradable polymer may be one kind of biodegradable polymer. Alternatively, the at least one biodegradable polymer may be a mixture of two or more kinds of biodegradable polymers. For example, the at least one biodegradable polymer may be a mixture of two or three kinds of biodegradable polymers, like two kinds of biodegradable polymers.

In one embodiment of the present invention, the at least one biodegradable polymer comprises, preferably consists of, two kinds of biodegradable polymers.

Alternatively, the at least one biodegradable polymer comprises, preferably consists of, one kind of biodegradable polymer.

According to one embodiment, the at least one biodegradable polymer is selected from the group comprising polylactic acid, polylactic acid-based polymer, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly (3-hydroxybutyrate-co-3-hydroxyvalerate); polybutyrate-adipate-terephthalate (PBAT), polyglyconate, poly(dioxanone), polybutylene succinate (PBS), polycaprolactone (PCL), polycaprolactone-poly(ethylene glycol) copolymer, polycaprolactone-polylactic acid copolymer, polyvinylalcohol (PVA), poly(ethylene succinate) (PES), poly(propylene succinate) (PPS), and mixtures thereof., preferably polylactic acid, polylactic acid-based polymer, polybutyrate-adipate-terephthalate (PBAT), and mixtures thereof.

In a preferred embodiment, the at least one biodegradable polymer is selected from the group consisting of polylactic acid, polylactic acid-based polymer, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly(3-hydroxybutyrate-co-3-hydroxyvalerate); polybutyrate-adipate-terephthalate (PBAT), polyglyconate, poly(dioxanone), polybutylene succinate (PBS), polycaprolactone (PCL), polycaprolactone-poly(ethylene glycol) copolymer, polycaprolactone-polylactic acid copolymer, polyvinylalcohol (PVA), poly(ethylene succinate) (PES), poly(propylene succinate) (PPS), and mixtures thereof.

In one embodiment, the at least one biodegradable polymer is selected from the group comprising, preferably consisting of, polylactic acid, polylactic acid-based polymer, polybutyrate-adipate-terephthalate (PBAT), and mixtures thereof.

If the at least one biodegradable polymer comprises, preferably consists of, one kind of biodegradable polymer, the biodegradable polymer is preferably polybutyrate-adipate-terephthalate (PBAT).

If the at least one biodegradable polymer comprises, preferably consists of, two kinds of biodegradable polymers, the at least one biodegradable polymer preferably comprises, more preferably consists of, a blend of polylactic acid or polylactic acid-based polymer and another biodegradable polymer selected from the group comprising, preferably consisting of, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly(3-hydroxybutyrate-co-3-hydroxyvalerate); polybutyrate-adipate-terephthalate (PBAT), polyglyconate, poly(dioxanone), polybutylene succinate (PBS), polycaprolactone (PCL), polycaprolactone-poly(ethylene glycol) copolymer, polycaprolactone-polylactic acid copolymer, polyvinylalcohol (PVA), poly(ethylene succinate) (PES) and poly(propylene succinate) (PPS).

In this case, the blend of the at least one biodegradable polymer comprises polylactic acid or polylactic acid-based polymer and another biodegradable polymer preferably in a weight ratio ranging from 9:1 to 1:10, more preferably in a weight ratio ranging from 1:10 to 1:2.

Alternatively, if the at least one biodegradable polymer comprises, preferably consists of, two kinds of biodegradable polymers, the at least one biodegradable polymer preferably comprises, more preferably consists of, a blend of polybutyrate-adipate-terephthalate (PBAT) and another biodegradable polymer selected from the group comprising, preferably consisting of, polylactic acid, polylactic acid-based polymer, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly(3-hydroxybutyrate-co-3-hydroxyvalerate); polyglyconate, poly(dioxanone), polybutylene succinate (PBS), polycaprolactone (PCL), polycaprolactone-poly(ethylene glycol) copolymer, polycaprolactone-polylactic acid copolymer, polyvinylalcohol (PVA), poly (ethylene succinate) (PES) and poly(propylene succinate) (PPS).

In this case, the blend of the at least one biodegradable polymer comprises polybutyrate-adipate-terephthalate (PBAT) and another biodegradable polymer preferably in a weight ratio ranging from 10:1 to 1:9, more preferably in a weight ratio ranging from 10:1 to 2:1.

For example, the at least one biodegradable polymer is a blend of polybutyrate-adipate-terephthalate (PBAT) and polylactic acid. Preferably, the blend comprises the polybutyrate-adipate-terephthalate (PBAT) and polylactic acid preferably in a weight ratio ranging from 10:1 to 1:9, more preferably in a weight ratio ranging from 10:1 to 2:1.

Alternatively, the at least one biodegradable polymer preferably comprises, more preferably consists of, a blend of polybutylene succinate (PBS) and another biodegradable polymer polylactic acid, polylactic acid-based polymer, polyhydroxyalkanoates (PHA), e.g. polyhydroxybutyrate (PHB), poly-3-hydroxybutyrate (P3HB), polyhydroxyvalerate, polyhydroxybutyrate-polyhydroxyvalerate copolymer, poly(3-hydroxybutyrate-co-3-hydroxyvalerate); polybutyrate-adipate-terephthalate (PBAT), polyglyconate, poly (dioxanone), polycaprolactone (PCL), polycaprolactone-poly(ethylene glycol) copolymer, polycaprolactone-polylactic acid copolymer, polyvinylalcohol (PVA), poly (ethylene succinate) (PES) and poly(propylene succinate) (PPS).

In one embodiment, the blend of the at least one biodegradable polymer comprises polybutylene succinate (PBS) and another biodegradable polymer preferably in a weight ratio ranging from 10:1 to 1:9, more preferably in a weight ratio ranging from 10:1 to 2:1. For example, the at least one biodegradable polymer is a blend of polybutylene succinate (PBS) and polylactic acid. Preferably, the blend comprises the polybutylene succinate (PBS) and polylactic acid preferably in a weight ratio ranging from 10:1 to 1:9, more preferably in a weight ratio ranging from 10:1 to 2:1.

In one embodiment, the at least one biodegradable polymer comprises polylactic acid. Preferably, the polylactic acid has from 1 to 10 wt.-%, more preferably between 2 and 5 wt.-% of D isomers, based on the total weight of the polylactic acid.

There is no specific limitation on the molecular weight of the polylactic acid used in this invention. However, the number average molecular weight Mn measured by gel permeation chromatography from 50 000 to 250 000 g/mol, preferably from 80 000 to 200 000 g/mol. If the number average molecular weight is smaller than the aforementioned range, the mechanical strength (tensile strength, impact strength) of the polymer composition is too low. On the other hand, if the number average molecular weight is larger than the aforementioned range, the melt viscosity may be too high for carrying out the processing. Additionally or alternatively, the polylactic acid preferably has a melt flow rate MFR (190° C., 2.16 kg) measured according to ISO 1133 of from 1.0 to 50.0 g/10 min, preferably of from 2.0 to 30.0 g/10 min and most preferably from 2.3 to 15.0 g/10 min.

Additionally or alternatively, the polylactic acid has a density in the range from 1.21 to 1.27 $g/m^3$, 1. and preferably from 1.23 to 1.25 $g/m^3$.

Examples of polylactic acid-based polymer suitable for the instant breathable film include copolymers of lactic acid and blends of polylactic acids.

If the polylactic acid-based polymer is a copolymer, the polylactic acid-based polymer may comprise further copolymer components in addition to lactic acid. Examples of the further copolymer component include hydroxybutyric acid, 3-hydroxybutyric acid, hydroxyvaleric acid, 3-hydroxyvaleric acid and citric acid.

The polylactic acid-based polymer preferably has a melt flow rate MFR (190° C., 2.16 kg) measured according to ISO 1133 of from 1.0 to 50.0 g/10 min, preferably of from 2.0 to 30.0 g/10 min and most preferably from 2.3 to 15.0 g/10 min.

The polybutyrate-adipate-terephthalate (PBAT) preferably has a melt flow rate MFR (190° C., 2.16 kg) measured according to ISO 1133 of from 1.0 to 50.0 g/10 min, preferably of from 1.5 to 30.0 g/10 min and most preferably from 2.0 to 15.0 g/10 min.

Additionally or alternatively, the polybutyrate-adipate-terephthalate (PBAT) has a density in the range from 1.21 to 1.28 $g/m^3$, 1. and preferably from 1.24 to 1.27 $g/m^3$.

As already set out above, it is required that the at least one biodegradable polymer has a tensile E-modulus, measured according to ISO 527-3, of below 2100 MPa. It is appreciated that polylactic acid polymers have a tensile E-modulus, measured according to ISO 527-3, of well above 2500 MPa, e.g. about 3200 MPa. Thus, if the at least one biodegradable polymer comprises polylactic acid, the at least one biodegradable polymer must comprise another biodegradable polymer in order to decrease the tensile E-modulus to below 2100 MPa.

For example, the at least one biodegradable polymer consists of polylactic acid in an amount ranging from 10 to 60 wt.-% and another biodegradable polymer, preferably polybutyrate-adipate-terephthalate (PBAT), in an amount ranging from 40 to 90 wt.-%, based on the total weight of the at least one biodegradable polymer. Preferably, the at least one biodegradable polymer consists of polylactic acid in an amount ranging from 10 to 50 wt.-% and another biodegradable polymer, preferably polybutyrate-adipate-terephthalate (PBAT), in an amount ranging from 50 to 90 wt.-%, based on the total weight of the at least one biodegradable polymer. More preferably, the at least one biodegradable polymer consists of polylactic acid in an amount ranging from 10 to 40 wt.-% and another biodegradable polymer, preferably polybutyrate-adipate-terephthalate (PBAT), in an amount ranging from 60 to 90 wt.-%, based on the total weight of the at least one biodegradable polymer. Most preferably, the at least one biodegradable polymer consists of polylactic acid in an amount ranging from 10 to 30 wt.-% and another biodegradable polymer, preferably polybutyrate-adipate-terephthalate (PBAT), in an amount ranging from 70 to 90 wt.-%, based on the total weight of the at least one biodegradable polymer.

Surface-Treated Filler Material Product

The breathable film of the present invention also comprises a surface-treated filler material product, wherein the surface-treated filler material product comprises at least one ground (especially wet ground) calcium carbonate-comprising filler material having several essential features, which are defined in claim 1 and will be described in more detail in the following.

The at least one ground calcium carbonate-comprising filler material in the meaning of the present invention refers to a filler material selected from among natural ground calcium carbonate (GCC), precipitated calcium carbonate (PCC), modified calcium carbonate (MCC), surface-treated calcium carbonate, or mixtures thereof. According to a preferred embodiment, the at least one ground calcium carbonate-comprising filler material is a natural ground calcium carbonate (GCC), more preferably the ground calcium carbonate-carbonate comprising filler is a wet ground natural ground calcium carbonate.

GCC is understood to be a naturally occurring form of calcium carbonate, mined from sedimentary rocks such as limestone or chalk, or from metamorphic marble rocks and processed through a treatment such as grinding, screening and/or fractionizing in wet form, for example by a cyclone or classifier. In one embodiment of the present invention, the GCC is selected from the group comprising marble, chalk, dolomite, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulphuric acid, hydrochloric acid, phosphoric acid, citric acid, oxalic acid, or a mixture thereof. In a next step, the calcium carbonate is treated with gaseous carbon dioxide. If a strong acid such as sulphuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US20120031576 A1, WO2009074492 A1, EP2264109 A1, EP2070991 A1, or EP2264108 A1.

In one preferred embodiment, the at least one ground calcium carbonate-comprising filler material is marble, more preferably a wet ground marble.

It is appreciated that the amount of ground (especially wet ground) calcium carbonate in the at least one calcium carbonate-comprising filler material is at least 80 wt.-%, e.g. at least 95 wt.-%, preferably between 97 and 100 wt.-%, more preferably between 98.5 and 99.95 wt.-%, based on the total dry weight of the at least one ground calcium carbonate-comprising filler material.

The at least one ground (especially wet ground) calcium carbonate-comprising filler material is preferably in the form of a particulate material, and may have a particle size distribution as conventionally employed for the material(s) involved in the type of product to be produced. In general, it is one specific requirement of the present invention that the at least one ground (especially wet ground) calcium carbonate-comprising filler material has a weight median particle size $d_{50}$ value in the range from 0.1 to 7 μm. For example, the at least one ground (especially wet ground) calcium carbonate-comprising filler material has a weight median particle size $d_{50}$ from 0.25 μm to 5 μm, preferably from 0.5 μm to 4 μm and most preferably from 0.6 μm to 2 μm.

A further requirement of the present invention is that the at least one ground (especially wet ground) calcium carbonate-comprising filler material has a top cut ($d_{98}$) of ≤15 μm. For example, the at least one ground (especially wet ground) calcium carbonate-comprising filler material has a top cut ($d_{98}$) of ≤12.5 μm, preferably of ≤10 μm, more preferably of ≤7.5 μm and most preferably of ≤6.5 μm.

It is appreciated that the weight median particle size $d_{50}$ value and the top cut ($d_{98}$) of the at least one ground (especially wet ground) calcium carbonate-comprising filler material fulfil a specific ratio. For example, the at least one ground (especially wet ground) calcium carbonate-comprising filler material has a ratio of weight median particle size $d_{50}$ value and the top cut ($d_{98}$) [$d_{50}/d_{98}$] of from 0.1 to 0.4, preferably from 0.1 to 0.3 and most preferably from 0.15 to 0.30.

Additionally or alternatively, the at least one ground (especially wet ground) calcium carbonate-comprising filler material has a fineness such that at least 5 wt.-%, preferably at least 7 wt.-%, even more preferably at least 9 wt.-% and most preferably at least 11 wt.-% of all particles have a particle size of <0.5 μm.

In one embodiment, the at least one ground (especially wet ground) calcium carbonate-comprising filler material has a fineness such that from 5 to 70 wt.-%, even more preferably from 7 to 60 wt.-% and most preferably from 9 to 50 wt.-% of all particles have a particle size of <0.5 μm. For example, from 11 to 15 wt.-% of all particles have a particle size of <0.5 μm. Alternatively, from 30 to 45 wt.-% of all particles have a particle size of <0.5 μm.

In one embodiment, the at least one ground (especially wet ground) calcium carbonate-comprising filler material has a) a weight median particle size $d_{50}$ from 0.25 μm to 5 μm, preferably from 0.5 μm to 4 μm, and most preferably from 0.6 μm to 2 μm, and
b) a top cut ($d_{98}$) of ≤12.5 μm, preferably of ≤10 μm, more preferably of ≤7.5 μm and most preferably of ≤6.5 μm, and
c) a fineness such that at least 5 wt.-%, preferably at least 7 wt.-%, even more preferably at least 9 wt.-% and most preferably at least 11 wt.-% of all particles have a particle size of <0.5 μm.

For example, the at least one ground (especially wet ground) calcium carbonate-comprising filler material has a) a weight median particle size $d_{50}$ from 0.6 μm to 2 μm, and
b) a top cut ($d_{98}$) of ≤6.5 μm, and
c) a fineness such that at least 11 wt.-% of all particles have a particle size of <0.5 μm.

It is further appreciated that the at least one ground (especially wet ground) calcium carbonate-comprising filler material has a BET specific surface area of from 0.5 and 150 $m^2/g$, as measured using nitrogen and the BET method according to ISO 9277. For example, the at least one ground (especially wet ground) calcium carbonate-comprising filler material has a specific surface area (BET) of from 0.5 to 50 $m^2/g$, more preferably of from 0.5 to 35 $m^2/g$ and most preferably of from 0.5 to 15 $m^2/g$, as measured using nitrogen and the BET method according to ISO 9277.

In a preferred embodiment, the at least one ground calcium carbonate-comprising filler material has a) a weight median particle size $d_{50}$ from 0.6 μm to 2 μm, and
b) a top cut particle size $d_{98}$ of ≤6.5 μm, and
c) a fineness such that at least 11 wt.-% of all particles have a particle size of <0.5 μm, and
d) a specific surface area (BET) of from 0.5 to 15 $m^2/g$, as measured using nitrogen and the BET method according to ISO 9277.

In one embodiment of the present invention, the at least one ground (especially wet ground) calcium carbonate-comprising filler material is preferably a marble having a median particle size diameter $d_{50}$ value from 0.1 μm to 7 μm, preferably from 0.25 μm to 5 μm, more preferably from 0.5 μm to 4 μm and most preferably from 0.6 μm to 2 μm. In this case, the at least one ground (especially wet ground) calcium carbonate-comprising filler material exhibits a BET specific surface area of from 0.5 to 150 $m^2/g$, preferably of from 0.5 to 50 $m^2/g$, more preferably of from 0.5 to 35 $m^2/g$ and most preferably of from 0.5 to 15 $m^2/g$, measured using nitrogen and the BET method according to ISO 9277.

In a preferred embodiment the ground calcium carbonate-comprising filler is a wet ground calcium carbonate-comprising filler. However, dry ground calcium carbonate-comprising fillers may also be used.

The wet grinding step may be performed under conditions such that autogenous grinding takes place and/or by horizontal ball milling, and/or other such processes known to the skilled man. The processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the wet ground calcium carbonate-comprising filler material in order to reduce the associated moisture content to a level which is not greater than about 0.5 wt.-%, based on the total dry weight of the at least one wet ground calcium carbonate-comprising filler material. The residual total moisture content of the filler can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one wet ground calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one wet ground calcium carbonate-comprising filler material is subjected to a beneficiation step (such as a flotation, bleaching or magnetic separation step) to remove impurities.

In another preferred embodiment, the at least one ground (especially wet ground) calcium carbonate-comprising filler material is a material being ground in a horizontal ball mill, and subsequently dried by using the well-known process of spray drying.

According to the present invention, the at least one ground calcium carbonate-comprising filler material has a residual moisture content in the range from 0.05 to 0.3 wt.-%, based on the total dry weight of the at least one ground calcium carbonate-comprising filler material.

In one embodiment, the at least one ground calcium carbonate-comprising filler material has a residual moisture content from 0.05 to 0.2 wt.-%, more preferably from 0.05 to 0.15 wt.-% and most preferably from 0.05 to 0.15 wt.-%, based on the total dry weight of the at least one ground calcium carbonate-comprising filler material.

For example, in case a ground (especially wet ground) and spray dried marble is used as the at least one ground calcium carbonate-comprising filler material, the residual total moisture content of the at least one ground calcium carbonate-comprising filler material is preferably of from 0.05 to 0.2 wt.-%, more preferably from 0.07 to 0.18 wt.-% and most preferably from 0.09 to 0.12 wt.-% based on the total dry weight of the at least one ground calcium carbonate-comprising filler material. If a PCC is used as the at least one ground calcium carbonate-comprising filler material, the residual total moisture content of the at least one ground calcium carbonate-comprising filler material is preferably of from 0.05 to 0.2 wt.-%, more preferably from 0.05 to 0.17 wt.-% and most preferably from 0.05 to 0.10 wt.-%, based on the total dry weight of the at least one ground calcium carbonate-comprising filler material.

According to the present invention the surface-treated filler material product further comprises a treatment layer on the surface of the at least one ground (especially wet ground) calcium carbonate-comprising filler material.

The treatment layer comprises i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or
ii. at least one saturated or unsaturated aliphatic linear or branched carboxylic acid and/or salts thereof, preferably at least one aliphatic carboxylic acid having a total amount of carbon atoms from C4 to C24 and/or a salt thereof.

In one embodiment, the treatment layer comprises i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, or
ii. at least one saturated or unsaturated aliphatic linear or branched carboxylic acid and/or salts thereof, preferably at least one aliphatic carboxylic acid having a total amount of carbon atoms from C4 to C24 and/or a salt thereof.

In an alternative embodiment, the treatment layer comprises i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and
ii. at least one saturated or unsaturated aliphatic linear or branched carboxylic acid and/or salts thereof, preferably at least one aliphatic carboxylic acid having a total amount of carbon atoms from C4 to C24 and/or a salt thereof.

It is especially preferred that the treatment layer comprises i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, or
ii. at least one saturated or unsaturated aliphatic linear or branched carboxylic acid and/or salts thereof, preferably at least one aliphatic carboxylic acid having a total amount of carbon atoms from C4 to C24 and/or a salt thereof.

Favorable properties as regards low noise in combination with good mechanical characteristic are especially obtained if the treatment layer comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof.

Thus, the treatment layer preferably comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof.

According to one embodiment of the present invention, the treatment layer comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof. Preferably, the treatment layer comprises at least one mono-substituted succinic anhydride consisting of succinic anhydride mono-substituted with a group being a linear aliphatic group having a total amount of carbon atoms from at least C2 to C30 in the substituent and/or salts thereof. Additionally or alternatively, the treatment layer comprises at least one mono-substituted succinic anhydride consisting of succinic anhydride mono-substituted with a group being a branched aliphatic group having a total amount of carbon atoms from at least C3 to C30 in the substituent and/or salts thereof. Additionally or alternatively, the treatment layer comprises at least one mono-substituted succinic anhydride consisting of succinic anhydride mono-substituted with a group being a cyclic aliphatic group having a total amount of carbon atoms from at least C5 to C30 in the substituent and/or salts thereof.

Accordingly, it should be noted that the at least one mono-substituted succinic anhydride may be one kind of mono-substituted succinic anhydride. Alternatively, the at least one mono-substituted succinic anhydride may be a mixture of two or more kinds of mono-substituted succinic anhydride. For example, the at least one mono-substituted succinic anhydride may be a mixture of two or three kinds of mono-substituted succinic anhydride, like two kinds of mono-substituted succinic anhydride.

In one embodiment of the present invention, the at least one mono-substituted succinic anhydride is one kind of mono-substituted succinic anhydride.

It is appreciated that the at least one mono-substituted succinic anhydride represents a surface treatment agent and consists of succinic anhydride mono-substituted with a group selected from any linear, branched, aliphatic, and cyclic group having a total amount of carbon atoms from C2 to C30 in the substituent.

In one embodiment of the present invention, the at least one mono-substituted succinic anhydride consists of succinic anhydride mono-substituted with a group selected from a linear, branched, aliphatic, and cyclic group having a total amount of carbon atoms from C3 to C20 in the substituent. For example, the at least one mono-substituted succinic anhydride consists of succinic anhydride mono-substituted with a group selected from a linear, branched, aliphatic, and cyclic group having a total amount of carbon atoms from C4 to C18 in the substituent. Preferably, the at least one mono-substituted succinic anhydride consists of succinic anhydride mono-substituted with a group being a linear aliphatic group having a total amount of carbon atoms from C3 to C20, more preferably from C4 to C18, in the substituent and/or salts thereof. Additionally or alternatively, the at least one mono-substituted succinic anhydride consists of succinic anhydride mono-substituted with a group being a branched aliphatic group having a total amount of carbon atoms from C3 to C20, more preferably from C4 to C18, in the substituent and/or salts thereof. Additionally or alternatively, the at least one mono-substituted succinic anhydride consists of succinic anhydride mono-substituted with a group being a cyclic aliphatic group having a total amount of carbon atoms from C5 to C20, more preferably from C5 to C18 in the substituent and/or salts thereof.

In one embodiment of the present invention, the at least one mono-substituted succinic anhydride consists of succinic anhydride mono-substituted with one group being a linear and aliphatic group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched and aliphatic group having a total amount of carbon atoms from C3 to C30, preferably from C3 to C20 and most preferably from C4 to C18 in the substituent.

Thus, it is preferred that the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, it is preferred that the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that, e.g., the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term “octadecanyl succinic anhydride” comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear or branched alkenyl group having a total amount of carbon atoms from C2 to C30, preferably from C3 to C20 and most preferably from C4 to C18 in the substituent.

The term “alkenyl” in the meaning of the present invention refers to a linear or branched, unsaturated organic compound composed of carbon and hydrogen. Said organic compound further contains at least one double bond in the substituent, preferably one double bond. In other words, “alkenyl mono-substituted succinic anhydrides” are composed of linear or branched, unsaturated hydrocarbon chains containing a pendant succinic anhydride group. It is appreciated that the term “alkenyl” in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term “hexadecenyl succinic anhydride” comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term “octadecenyl succinic anhydride” comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥90 wt.-% and preferably of ≥92.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

If the at least one mono-substituted succinic anhydride is a mixture of two or more kinds of alkenyl mono-substituted succinic anhydrides, one alkenyl mono-substituted succinic anhydride is linear or branched octadecenyl succinic anhydride, while each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. For example, the at least one mono-substituted succinic anhydride is a mixture of two or more kinds of alkenyl mono-substituted succinic anhydrides, wherein one alkenyl mono-substituted succinic anhydride is linear octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof. Alternatively, the at least one mono-substituted succinic anhydride is a mixture of two or more kinds of alkenyl mono-substituted succinic anhydrides, wherein one alkenyl mono-substituted succinic anhydride is branched octadecenyl succinic anhydride and each further alkenyl mono-substituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride and mixtures thereof.

For example, the at least one mono-substituted succinic anhydride is a mixture of two or more kinds of alkenyl mono-substituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one mono-substituted succinic anhydride is a mixture of two or more kinds of alkenyl mono-substituted succinic anhydrides, it is appreciated that one alkenyl mono-substituted succinic anhydride is present in an amount of from 20 to 60 wt.-% and preferably of from 30 to 50 wt.-%, based on the total weight of the at least one mono-substituted succinic anhydride provided in step b).

For example, if the at least one mono-substituted succinic anhydride is a mixture of two or more kinds of alkenyl mono-substituted succinic anhydrides comprising one or more hexadecenyl succinic anhydride(s), like linear or branched hexadecenyl succinic anhydride(s), and one or more octadecenyl succinic anhydride(s), like linear or branched hexadecenyl succinic anhydride(s), it is preferred that the one or more octadecenyl succinic anhydride(s) is present in an amount of from 20 to 60 wt.-% and preferably of from 30 to 50 wt.-%, based on the total weight of the at least one mono-substituted succinic anhydride provided in step b).

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride.

Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

It is appreciated that the treatment layer may further comprise salty reaction products such as one or more calcium and/or magnesium salts of the at least one mono-substituted succinic anhydride consisting of succinic anhydride mono-substituted with a group selected from a linear, branched, aliphatic and cyclic group having a total amount of carbon atoms from at least C2 to C30 in the substituent.

Such “salty reaction products” of the at least one mono-substituted succinic anhydride in the meaning of the present invention refers to products obtained by contacting the at least one ground (especially wet ground) calcium carbonate-comprising filler material with the at least one mono-substituted succinic anhydride. Said reaction products are formed between at least a part of the applied at least one mono-substituted succinic anhydride and reactive molecules located at the surface of the at least one filler material, preferably the at least one ground (especially wet ground) calcium carbonate-comprising filler material.

Additionally or alternatively, the treatment layer comprises at least one saturated or unsaturated aliphatic linear or branched carboxylic acid and/or salts thereof preferably at least one aliphatic carboxylic acid having a total amount of carbon atoms from C4 to C24 and/or a salt thereof, more preferably at least one aliphatic carboxylic acid having a total amount of carbon atoms from C12 to C20 and/or a salt thereof, most preferably at least one aliphatic carboxylic acid having a total amount of carbon atoms from C16 to C18 and/or a salt thereof.

The carboxylic acid in the meaning of the present invention may be selected from one or more linear chain, branched chain, saturated, or unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid and/or salt thereof is selected from saturated unbranched carboxylic acids, preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid, their salts, their anhydrides and mixtures thereof.

In another embodiment of the present invention, the aliphatic linear or branched carboxylic acid and/or salt thereof is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid, their salts, their anhydrides and mixtures thereof.

Preferably, the aliphatic carboxylic acid and/or a salt or anhydride thereof is stearic acid and/or a stearic acid salt or stearic anhydride. Most preferably, the aliphatic carboxylic acid is stearic acid.

Alternatively, the unsaturated aliphatic linear or branched carboxylic acid is preferably selected from the group consisting of myristoleic acid, palmitoleic acid, sapienic acid, oleic acid, elaidic acid, vaccenic acid, linoleic acid, α-linolenic acid, eicosapentaenoic acid, docosahexaenoic acid and mixtures thereof. More preferably, the unsaturated aliphatic linear or branched carboxylic acid selected from the group consisting of myristoleic acid, palmitoleic acid, sapienic acid, oleic acid, elaidic acid, vaccenic acid, linoleic acid, α-linolenic acid and mixtures thereof. Most preferably, the unsaturated aliphatic linear or branched carboxylic acid is oleic acid and/or linoleic acid, preferably oleic acid or linoleic acid, most preferably linoleic acid.

Additionally or alternatively, the treatment layer comprises a salt of an unsaturated aliphatic linear or branched carboxylic acid.

The term "salt of an unsaturated aliphatic linear or branched carboxylic acid" refers to an unsaturated fatty acid, wherein the active acid group is partially or completely neutralized. The term "partially neutralized" unsaturated aliphatic linear or branched carboxylic acid refers to a degree of neutralization of the active acid groups in the range from 40 and 95 mole-% preferably from 50 to 95 mole-%, more preferably from 60 to 95 mole-% and most preferably from 70 to 95 mole-%. The term "completely neutralized" unsaturated aliphatic linear or branched carboxylic acid refers to a degree of neutralization of the active acid groups of >95 mole-%, preferably of >99 mole-%, more preferably of >99.8 mole-% and most preferably of 100 mole-%. Preferably, the active acid groups are partially or completely neutralized.

The salt of unsaturated aliphatic linear or branched carboxylic acid is preferably a compound selected from the group consisting of sodium, potassium, calcium, magnesium, lithium, strontium, primary amine, secondary amine, tertiary amine and/or ammonium salts thereof, whereby the amine salts are linear or cyclic. For example, the unsaturated aliphatic linear or branched carboxylic acid is a salt of oleic acid and/or linoleic acid, preferably oleic acid or linoleic acid, most preferably linoleic acid.

It is appreciated that the treatment layer may further comprise salty reaction products such as one or more calcium and/or magnesium salts of the at least one saturated or unsaturated aliphatic linear or branched carboxylic acid, preferably at least one aliphatic carboxylic acid having a total amount of carbon atoms from C4 to C24.

Such "salty reaction products" of the at least one saturated or unsaturated aliphatic linear or branched carboxylic acid in the meaning of the present invention refers to products obtained by contacting the at least one ground (especially wet ground) calcium carbonate-comprising filler material with the at least one saturated or unsaturated aliphatic linear or branched carboxylic acid. Said reaction products are formed between at least a part of the applied at least one saturated or unsaturated aliphatic linear or branched carboxylic acid and reactive molecules located at the surface of the at least one filler material, preferably the at least one ground (especially wet ground) calcium carbonate-comprising filler material.

The treatment layer is formed on the surface of said at least one ground (especially wet ground) calcium carbonate-comprising filler material.

It is one requirement of the present invention that the surface-treated filler material product comprises the treatment layer in an amount from 0.1 to 3 wt.-%, based on the total dry weight of the at least one ground (especially wet ground) calcium carbonate-comprising filler material.

According to one embodiment the surface-treated filler material product comprises the treatment layer in an amount of from 0.1 to 2.8 wt.-%, more preferably in an amount of from 0.1 to 2.5 wt.-%, even more preferably in an amount of from 0.3 to 2.5 wt.-% and most preferably in an amount of from 0.5 to 2.5 wt.-% based on the total dry weight of the at least one ground (especially wet ground) calcium carbonate-comprising filler material.

The treatment layer is preferably characterized in that the total weight of the at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof and/or the at least one saturated or unsaturated aliphatic linear or branched carboxylic acid and/or salts thereof, preferably at least one aliphatic carboxylic acid having a total amount of carbon atoms from C4 to C24 and/or a salt thereof on the surface of the surface-treated filler material product is from 0.05 to 1 wt.-%/m$^2$, more preferably from 0.1 to 0.5 wt.-%/m$^2$ and most preferably from 0.15 to 0.25 wt.-%/m$^2$ of the at least one ground (especially wet ground) calcium carbonate-comprising filler material.

In one embodiment of the present invention, the treatment layer is characterized in that the total weight of the at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof and/or the at least one saturated or unsaturated aliphatic linear or branched carboxylic acid and/or salts thereof, preferably at least one aliphatic carboxylic acid having a total amount of carbon atoms from C4 to C24 and/or a salt thereof on the surface of the surface-treated filler material product is from 0.1 to 5 mg/m$^2$, more preferably from 0.25 to 4.5 mg/m$^2$ and most preferably from 1.0 to 4.0 mg/m$^2$ of the at least one calcium carbonate-comprising material.

In particular, the surface-treated filler material product features a low water pick up susceptibility. It is preferred that the moisture pick up susceptibility of the surface-treated filler material product is such that its total surface moisture level is less than 1 mg/g of dry calcium carbonate-comprising filler material, at a temperature of about +23° C. (±2° C.). For example, the surface-treated filler material product has a moisture pick up susceptibility of from 0.1 to 1 mg/g, more preferably of from 0.2 to 0.9 mg/g and most preferably of from 0.2 to 0.8 mg/g of dry calcium carbonate-comprising material after at a temperature of +23 C (±2° C.).

According to one embodiment the breathable film comprises the surface-treated filler material product in an amount from 40 to 65 wt.-%, based on the total weight of the breathable film, preferably from 40 to 60 wt.-%, and most preferably from 40 wt.-% to 55 wt.-%.

The surface-treated filler material product described above is used as filler in a breathable film.

Breathable Film

According to the present invention a breathable film comprising at least one biodegradable polymer and from 35 to 65 wt.-%, based on the total weight of the breathable film, of a surface-treated filler material product is provided, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 m$^2$/g, as measured using nitrogen and the BET method according to ISO 9277, and a residual total moisture content in the range from 0.05 to 0.3 wt.-%, based on the total dry weight of the at least one ground calcium carbonate-comprising filler material B) a treatment layer on the surface of the at least one ground calcium carbonate-comprising filler material comprising i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material, and wherein the at least one biodegradable polymer has a tensile E-modulus, measured according to ISO 527-3, of below 2100 MPa.

The breathable film comprises at least one biodegradable polymer and from 35 to 65 wt.-%, based on the total weight of the breathable film, of a surface-treated filler material product. Thus, it is appreciated that the breathable film of the present invention is a biodegradable breathable film.

The breathable film may be prepared in broad range of basis weight. Thus, the breathable film has a basis weight from 8 to 40 $g/m^2$, preferably from 15 to 38 $g/m^2$, and most preferably from 20 to 36 $g/m^2$.

According to one embodiment, the thickness of the breathable film is from 6 to 40 μm.

The breathable film is advantageous as it is biodegradable and provides low noise properties. Furthermore, the breathable film provides good mechanical properties.

For example, at a basis weight from 8 to 36 $g/m^2$, preferably from 20 to 36 $g/m^2$, the breathable film has a force at break in CD direction, measured according to ISO 527-3, in the range from 0.3 to 15 N, more preferably in the range from 0.5 to 12 N, even more preferably in the range from 0.5 to 10 N and most preferably from 0.5 to 5.5 N.

In one embodiment, at a basis weight from 8 to 16 $g/m^2$, the breathable film has a force at break in CD direction, measured according to ISO 527-3, in the range from 0.3 to 15 N, more preferably in the range from 0.5 to 12 N, even more preferably in the range from 0.5 to 10 N and most preferably from 0.5 to 5.5 N.

Additionally or alternatively, at a basis weight from 8 to 36 $g/m^2$, preferably from 20 to 36 $g/m^2$, the breathable film has a force at break in MD direction, measured according to ISO 527-3, in the range from 3 to 40 N, more preferably in the range from 6 to 32 N and most preferably in the range from 8 to 28 N.

In one embodiment, at a basis weight from 8 to 16 $g/m^2$, the breathable film has a force at break in MD direction, measured according to ISO 527-3, in the range from 0.3 to 15 N, more preferably in the range from 3 to 40 N, more preferably in the range from 6 to 32 N and most preferably in the range from 8 to 28 N.

Additionally or alternatively, at a basis weight from 8 to 36 $g/m^2$, preferably from 20 to 36 $g/m^2$, the breathable film has a modulus of elasticity in CD direction, measured according to ISO 527-3, in the range from 20 to 1000 $N/mm^2$, and most preferably in the range from 20 to 490 $N/mm^2$.

In one embodiment, at a basis weight from 8 to 16 $g/m^2$, the breathable film has a modulus of elasticity in CD direction, measured according to ISO 527-3, in the range from 20 to 1000 $N/mm^2$, and most preferably in the range from 20 to 490 $N/mm^2$.

Additionally or alternatively, at a basis weight from 8 to 36 $g/m^2$, preferably from 20 to 36 $g/m^2$, the breathable film has a modulus of elasticity in MD direction, measured according to ISO 527-3, in the range from 100 to 2000 $N/mm^2$, and most preferably in the range from 100 to 1700 $N/mm^2$.

In one embodiment, at a basis weight from 8 to 16 $g/m^2$, the breathable film has a modulus of elasticity in MD direction, measured according to ISO 527-3, in the range from 100 to 2000 $N/mm^2$, and most preferably in the range from 100 to 1700 $N/mm^2$.

Additionally or alternatively, at a basis weight from 8 to 36 $g/m^2$, preferably from 20 to 36 $g/m^2$, the breathable film has a maximum elongation at break in CD direction, measured according to ISO 527-3, in the range from 5 to 1000%, and most preferably in the range from 16 to 800%.

In one embodiment, at a basis weight from 8 to 16 $g/m^2$, the breathable film has a maximum elongation at break in CD direction, measured according to ISO 527-3, in the range from 5 to 1000%, and most preferably in the range from 16 to 800%.

Additionally or alternatively, at a basis weight from 8 to 36 $g/m^2$, preferably from 20 to 36 $g/m^2$, the breathable film has a maximum elongation at break in MD direction, measured according to ISO 527-3, in the range from 5 to 500%, and most preferably in the range from 27 to 200%.

In one embodiment, at a basis weight from 8 to 16 $g/m^2$, the breathable film has a maximum elongation at break in MD direction, measured according to ISO 527-3, in the range from 5 to 500%, and most preferably in the range from 27 to 200%.

Additionally or alternatively, at a basis weight from 8 to 36 $g/m^2$, preferably from 20 to 36 $g/m^2$ the breathable film has a water column (hydrostatic pressure), measured in accordance with the method outlined in the example section, in the range from 50 to 700 mbar, and most preferably in the range from 75 to 600 mbar.

In one embodiment, at a basis weight from 8 to 16 $g/m^2$, the breathable film has a water column (hydrostatic pressure), measured in accordance with the method outlined in the example section, in the range from 50 to 700 mbar, and most preferably in the range from 75 to 600 mbar.

Furthermore, it is appreciated that the breathable film has a good surface quality and a reduced potential of skin irritation.

The breathability of the breathable film can be measured by its water vapour transmission rate. According to one embodiment the breathable film has a water vapour transmission rate (WVTR) from 500 to 5000 $g/(m^2\text{-day})$, preferably from 750 to 3000 $g/(m^2\text{-day})$, and more preferably from 600 to 1500 $g/(m^2\text{-day})$, measured with a Lyssy L80-5000 measuring device according to ASTM 398.

According to one embodiment the breathable film has a hydrostatic pressure from 100 to 1000 mbar, preferably from 200 to 800 mbar, and more preferably from 250 to 650 mbar, measured with a FX 3000 Hydrotester according to the method which has been described above.

According to one embodiment the breathable film further comprises additives selected from the group consisting of UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti block agents, coupling agents, dispersants, compatibilizers, oxygen scavengers, acid scavengers, markers, antifogging agents, surface modifiers, flame retardants, blowing agents, smoke suppressors, reinforcement agents, such as glass fibres, carbon fibres and/or glass bubbles, or mixtures of the foregoing additives.

Preferably, the additives are selected from the class of acid scavengers based on salts of long chain carboxylic acids, such as calcium stearate, magnesium stearate, zinc stearate, and calcium lactate, or may be hydrotalcite, from the class of stabilizers based on phenolic antioxidants, benzofuranones, hydroxylamines, nitrones, thiosynergists, and phosphites/phosphonites, from the class of light stabilizers based on hindered amines (HALS), from the class of metal deactivators, from the class of dispersing agents, coupling agents, or compatibilizers, or a mixture of any of the foregoing additives.

Suitable phenolic antioxidants are, for example: Octadecyl-3-(3,5-di-tert-butyl-4-hydroxyphenyl)propanonate, pentaerythritol-tetrakis[3-(3,5-di-tert-butyl-4-hydro-xyphenyl)propanoate, tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propanoate, N,N'-hexane-1,6-diyl-bis[3-(3,5-di-tert-butyl-4-hydroxyphenyl)propanamide Suitable phosphites/phosphonites are, for example: Tris-(2,4-di-tertbutylphenyl)phosphite, 3,9-bis(2,4-di-tert-butylphenoxy)-2,4,8,10-tetraoxa-3,9-diphosphaspiro[5.5] undecene, tetrakis(2,4-di-tert-butylphenyl)[1,1-biphenyl]-4,4'-diylbisphosphonite.

Suitable sterically hindered amines are, for example: 1,1-Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinon), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4.5]decene and epichlorohydrine.

Suitable dispersants are, for example: Polyacrylates, such as copolymers with long side chains, and polyacrylate block copolymers; alkylamides, such as N,N'-1,2-ethanediylbisoctadecaneamide; sorbitan esters, such as monostearylsorbitan ester; titanates und zirconates; reactive copolymers, such as polypropylene-acrylic acid copolymer; polypropylene-maleic anhydride copolymer; polyethylene-glycidylmethacrylate copolymer; polystyrol-maleic anhydride-polysiloxane alternating copolymer, such as dimethylsilanediol-ethyleneoxide copolymer; polyphenylsiloxan copolymer; amphiphilic copolymers, such as polyethylene-polyethyleneoxide block copolymer; and dendrimers, such as hydroxy containing dendrimers.

A suitable metal deactivator may be, for example, N,N'-bis(3,5-di-tert-butyl-4-hydroxyphenylpropionyl)hydrazine. According to another embodiment, the metal deactivator may be selected from one or more of the following structures:

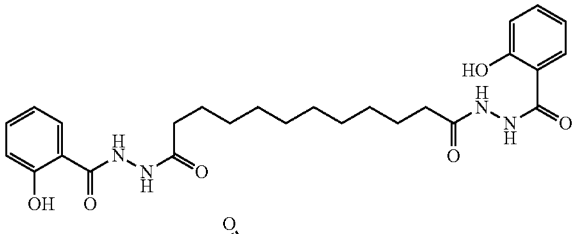

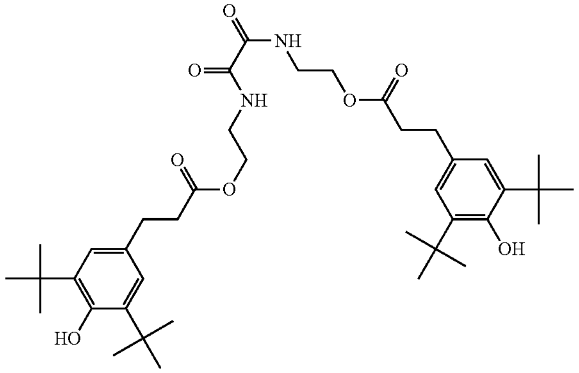

According to a preferred embodiment the breathable film comprises comprising at least one biodegradable polymer and from 35 to 65 wt.-%, based on the total weight of the breathable film, of a surface-treated filler material product, wherein the surface-treated filler material product comprises A) at least one ground (especially wet ground) calcium carbonate, preferably natural ground calcium carbonate, having a weight median particle size $d_{50}$ in the range from 0.25 μm to 5 μm, preferably from 0.5 μm to 4 μm, and most preferably from 0.6 μm to 2 μm, a top cut particle size $d_{98}$ of ≤12.5 μm, preferably of ≤10 μm, a specific surface area (BET) from 0.5 to 35 $m^2/g$, preferably from 0.5 to 15 $m^2/g$ as measured using nitrogen and the BET method according to ISO 9277, and a residual total moisture content from 0.05 to 0.2 wt.-%, preferably from 0.05 to 0.15 wt.-%, based on the total dry weight of the at least one ground calcium carbonate-comprising filler material, and B) a treatment layer on the surface of the at least one ground calcium carbonate-comprising filler material comprising, i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 1 wt.-%, preferably from 0.2 to 0.08 wt.-%, based on the total dry weight of the at least one ground calcium carbonate-comprising filler material, wherein the at least one biodegradable polymer has a tensile E-modulus, measured according to ISO 527-3, of below 1700 MPa, more preferably of below 1500 MPa, even more preferably of below 1000 MPa and most preferably of below 700 MPa.

The breathable film of the present invention may be produced by any method known in the art. According to one embodiment, a process of producing a breathable film comprises the steps of:

a) providing a composition comprising at least one biodegradable polymer band from 35 to 65 wt.-%, based on the total weight of the composition, of a surface-treated filler material product, wherein the at least one biodegradable polymer has a tensile E-modulus, measured according to ISO 527-3, of below 2100 MPa, and b) forming a film from the composition of step a), and c) stretching the film obtained in step b) into at least one direction, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 $m^2/g$, as measured using nitrogen and the BET method according to ISO 9277, and a residual total moisture content in the range from 0.05 to 0.3 wt.-%, based on the total dry weight of the at least one ground calcium carbonate-comprising filler material, and B) a treatment layer on the surface of the at least one ground calcium carbonate-comprising filler material comprising i. at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, and/or ii. at least one saturated or unsaturated aliphatic linear or branched carboxylic acid and/or salts thereof, preferably at least one aliphatic carboxylic acid having a total amount of carbon atoms from C4 to C24 and/or a salt thereof, wherein the surface-treated filler material product comprises the treatment layer in an amount of from 0.1 to 3 wt.-%, based on the total dry weight of the at least one ground calcium carbonate-comprising filler material.

The composition of the at least one biodegradable polymer and the surface-treated filler material product provided in process step a) can be produced by mixing or compounding said components. The at least one biodegradable polymer and the surface-treated filler material product, and, if present, other optional additives, may be mixed by the use of a suitable mixer, e.g. a Henschel mixer, a super mixer, a tumbler type mixer or the like. The compounding step may be done with a suitable extruder, preferably by a twin screw extruder (co- or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and water ring pelletizing or by (cold cut) strand pelletizing with underwater and conventional strand pelletizing to form the extruded polymer mass into pellets.

Optionally, the compounding step may also be performed with a discontinuous or batch process using an internal (batch) mixer, e.g. a Banburry mixer (HF Mixing Group) or a Brabender mixer (Brabender) or the like.

According to an optional embodiment, the composition provided in process step a) further comprises one or more of the additives described above.

According to one embodiment the composition provided in process step a) is a masterbatch. According to a preferred embodiment the masterbatch comprises the surface-treated filler material product in an amount of from 50 to 85 wt.-%, preferably from 60 to 85 wt.-% and more preferably from 70 to 80 wt.-%, based on the total weight of the masterbatch. The masterbatch may be in form of pellets, beads, or granules.

According to one embodiment of the present invention the composition provided in step a) is a masterbatch or a compound obtained by mixing and/or kneading the at least one thermoplastic polymer and the surface-treated filler material product to form a mixture and continuously pelletizing the obtained mixture. For example, the pelletizing of the obtained mixture can be carried out under water. Continuously means at least 1 hour, preferably at least 2 hours and most preferably at least 3 hours without interruption. For example, continuously means at least 8 hours, preferably at least 24 hours and more preferably more than 170 hours without interruption.

The risk of leaching of the surface coating, especially when in contact with human skin, is minimized with the inventive surface coating. Therefore, by using the surface-treated filler material product of the present invention, preferably a product in which the treatment layer on the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salts thereof, a breathable film with a reduced potential of skin irritation can be produced.

The inventors of the present invention found that the use of the surface-treated filler material product of the present invention in a biodegradable breathable films may result in a finely and homogenously filled breathable film material providing low noise and sufficient mechanical properties. Without being bound to any theory it is believed that the specific properties of the surface-treated filler material product according to the present invention may render it especially suitable for application in biodegradable breathable films, which require to have the fillers as equally distributed through the film as possible, in order to obtain a uniform distribution barrier and vapour transmission properties throughout the film.

The masterbatch may be used directly in process step b) or may be mixed with one or more biodegradable polymers before process step b). The masterbatch can also be mixed with one or more of the additives described above. According to a preferred embodiment, the masterbatch is used directly in process step b).

The process step b) may be carried out by any well-known techniques used for preparing polymer films. Examples of suitable film extrusion techniques are blown film extrusion or cast film extrusion, preferably cast film extrusion.

In process step c) the film obtained in process step b) is stretched into at least one direction. During the stretching step the polymer may be delaminated from the surface of the surface-treated filler material product, whereby pores can be formed in the breathable film. The stretching step c) may be carried out by any means known in the art.

The film can be stretched in at least a uniaxial direction at a temperature of from room temperature to the softening point of the at least one biodegradable polymer by well-known techniques such as a roll method, an interdigitizing method, a tenter method, a ring rolling method or intermeshing gear stretching.

According to one embodiment, in process step c) the film obtained in step b) is stretched by machine direction orientation (MDO). As known to the skilled person, the MDO process consists of a series of stages such as preheating, orienting, annealing and cooling. Typically, the film enters the MDO and is preheated to the required orientation temperature. In the orienting stage, the film is nipped between a slow and a fast, rotating roller. Depending on the desired film properties, the film can be quenched or annealed after orientation. In the final stage, the film may be cooled to near ambient temperature.

Alternatively, stretching step c) is carried out by a ring rolling method. The method typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Ring rolling may be also referred to as incremental stretching. Suitable methods for ring rolling are described e.g. in U.S. Pat. Nos. 4,107,364, 4,834,741, 5,143,679, 5,156,793 or U.S. Pat. No. 5,167,897, which are incorporated herewith by reference.

The stretching may be carried out by one step or by several steps. According to one embodiment process step c) is carried out from 1 to 10 times.

Stretch magnification determines film breakage at high stretching as well as breathability and the water vapour transmission of the obtained film, and so excessively high stretch magnification and excessively low stretch magnification are desirably avoided. According to one embodiment, in process step c), the film obtained in step b) is stretched to a stretch magnification from 1.2 to 6 times, more preferably 1.2 to 4 times into at least one direction.

According to one embodiment in step c) of the inventive process, the film obtained in step b) is stretched in two directions. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto.

According to one embodiment process step c) is carried out at a temperature of about 30 to 160° C., preferably from 40 to 130° C., more preferably from 50 to 80° C., and most preferably from 50 to 70° C.

After the stretching, a heat setting treatment may be carried out if required in order to stabilize the structure of the breathable film. The heat setting treatment may be, for example, a heat setting treatment at a temperature in the range of from the softening point of the polymer to a temperature less than about the melting point of the polymer for a period of 0.1 to 100 s.

The inventors of the present invention found that the biodegradable breathable film according to the present invention provides low noise, retains good breathability and mechanical properties. The inventive breathable film may be especially suitable for hygiene products such as baby diapers, adult incontinence products, or wound dressings.

The breathable film according to the present invention can be used in many different applications. According to one embodiment, the breathable film is used in hygienic applications, medical applications, healthcare applications, filtration materials, geotextile products, agricultural applications, horticultural applications, clothing, footwear products, baggage products, household applications, industrial applications, packaging applications, building applications, or construction.

According to a further aspect of the present invention, an article comprising a breathable film according to the present invention is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the building and construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The scope and interest of the invention will be better understood based on the following examples which are intended to illustrate certain embodiments of the present invention and are non-limitative.

EXAMPLES

1 Measurement Methods and Materials

In the following, measurement methods and materials implemented in the examples are described.

Particle Size

The particle distribution of the untreated ground calcium carbonate-comprising filler material was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Specific Surface Area (BET)

The specific surface area was measured via the BET method according to ISO 9277:2010 using nitrogen as adsorbing gas on a Micromeritics ASAP 2460 instrument from Micromeritics. The samples were pretreated in vacuum (10-5 bar) by heating at 150° C. for a period of 60 min prior to measurement.

Amount of Surface-Treatment Layer

The amount of the treatment layer on the calcium carbonate-comprising material is calculated theoretically from the values of the BET of the untreated calcium carbonate-comprising material and the amount of the one or more compound(s) that is/are used for the surface-treatment. It is assumed that 100% of the one or more compound(s) are present as surface treatment layer on the surface of the calcium carbonate-comprising material.

Ash Content

The ash content in [%] of the masterbatches was determined by incineration of a sample in an incineration crucible which is put into an incineration furnace at 570° C. for 2 hours. The ash content is measured as the total amount of remaining inorganic residues.

Melt Flow Rate

The "melt flow rate" was measured on a CEAST Melt Flow modular line instrument from Instron. The instruments and the measuring method are known to the skilled person. The melt flow rate was measured according to DIN EN ISO 1133-1:2011 by using procedure A. The samples were pre-dried for 4 hours at 70° C. and then immediately measured.

Force at Break

Force at Break Determination was Performed According to ISO 527-3. The Film Specimen Width was of 15 mm and the testing length was 5 cm.

Maximum Elongation at Break

Elongation at break determination was performed according to ISO 527-3. The film specimen width was of 15 mm and the testing length was 5 cm.

Tensile E-Modulus (Modulus of Elasticity)

Tensile E-modulus determination was performed according to ISO 527-3. The film specimen width was of 15 mm and the testing length was 5 cm. The E-modulus corresponded to the inclination of the tensile test curve between the points at 0.02% and 2% elongation.

Likewise, the E-modulus of sheets was measured from samples in machine direction. Tensile E-modulus determination was performed according to ISO 527-3. The sheet specimen width was of 15 mm and the testing length was 5 cm. The E-modulus corresponded to the inclination of the tensile test curve between the points at 0.02% and 2% elongation.

Acoustical Evaluation of the Films

From each film sample a 10 cm×30 cm large sample (with the long side in machine direction) is prepared by cutting. A lab technician holds the film on both 10 cm long ends and pushes his hands together so that they touch each other than the hands are pushed back again, so that the film is folded and unfolded. This folding and unfolding is done every 2 seconds. Another blindfolded lab technician sits on a chair 1 meter away from the film with his face towards the film. The noise created by the film sample is then evaluated on a scale of 10 (very unpleasant) to 1 (not noticeable).

Noise Level of the Films

From each film sample, a 14.5 cm×14.5 cm large specimen was prepared by cutting. The film was laid on a stainless steel cylinder with 10 cm height and 7.5 cm outer diameter and 4.8 cm inner diameter. The centre of the film was placed on the centre of the cylinder. The cylinder was mounted in a Zwick materials testing machine Z020. A 7.7 cm long steel pin with 2.3 cm diameter and a rounded end with 2.3 cm diameter was mounted on the moveable upper frame 12 cm above the cylinder in the central axis. A microphone (Norsonic Nor150, resolution: 0.125 seconds, time weighting: fast) was placed horizontally in 9 cm distance from the centre of the top base of the cylinder. The upper frame started to move downwards with the pin with a constant speed of 400 mm/min in such a way that the pin pushed the film specimen into the cylinder. By doing that the film deformed and created noise. The noise was measured by the microphone from the time when the pin touched the film specimen until the film was pushed 7 cm into the cylinder. The energetic mean was determined over this time period and the background noise generated e.g. by the Zwick testing machine, the air condition, and the ventilation was subtracted. The background noise was measured before without film specimen. Each specimen was measured 5 times and the energetic mean was calculated. This value was called the noise of level of the film given in dBA.

Water Vapour Transmission Rate (WVTR)

The WVTR value of the breathable films was measured with a Lyssy L80-5000 (PBI-Dansensor A/S, Denmark) measuring device according to ASTM E398.

Hydrostatic Pressure Test (Water Column)

The hydrostatic pressure test has been carried out according to a procedure which is equivalent to AATCC Test Method 127-2013, WSP 80.6 and ISO 811. A film sample (test area=10 $cm^2$) was mounted to form a cover on the test head reservoir. This film sample was subjected to a standardized water pressure, increased at a constant rate until leakage appears on the outer surface of the film, or water burst occurred as a result of film failure (pressure rate gradient=100 mbar/min.). Water pressure was measured as the hydrostatic head height reached at the first sign of leakage in three separate areas of the film sample or when burst occurs. The head height results were recorded in centimetres or millibars of water pressure on the specimen.

A higher value indicated greater resistance to water penetration. The TEXTEST FX-3000, Hydrostatic Head Tester (Textest AG, Switzerland), was used for the hydrostatic pressure measurements.

Moisture Content

The residual moisture content was determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

Moisture Pick-Up Susceptibility

The term "moisture pick-up susceptibility" in the meaning of the present invention refers to the amount of moisture adsorbed on the surface of the mineral filler and can by gravimetrically determined in mg moisture/g of the dry treated mineral filler product after exposure to an atmosphere of 10% of relative humidity, at a temperature of +23° C. (±2° C.) until equilibrium in weight. Then the humidity is changed to 85% relative humidity until the sample is at equilibrium. The difference in weight is defined as the water pick-up. The equipment used was Gintronic Gravitest 6300.

2 Materials

CC1 (inventive): Natural ground calcium carbonate, commercially available from Omya International AG, Switzerland ($d_{50}$: 1.7 μm; $d_{98}$: 6 μm, content of particles<0.5 μm=12%), surface-treated with 0.7 wt. % alkenyl succinic anhydride (CAS [68784-12-3], concentration>93%) based on the total weight of the ground calcium carbonate. BET: 3.4 g/m$^2$, residual moisture content: 0.09 wt.-%, moisture pick-up: 0.58 mg/g.

CC2 (inventive): Natural ground calcium carbonate, commercially available from Omya International AG, Switzerland ($d_{50}$: 0.8 μm; $d_{98}$: 3 μm, content of particles<0.5 μm=35%), alkenyl succinic anhydride (CAS [68784-12-3], concentration>93%) based on the total weight of the natural ground calcium carbonate. BET: 8.5 m$^2$/g, residual moisture content: 0.15 wt.-%, moisture pick-up: 0.08 mg/g CC3 (inventive): Natural ground calcium carbonate, commercially available from Omya International AG, Switzerland ($d_{50}$: 1.7 μm; $d_{98}$: 6 μm, content of particles<0.5 μm=12%), surface-treated with 1.0 wt.-% stearic acid (commercially available from Sigma-Aldrich, Croda) based on the total weight of the natural ground calcium carbonate. BET: 3.4 m$^2$/g, residual moisture content: 0.09 wt.-%, moisture pick-up: 0.58 mg/g.

P1: PLA NatureWorks Ingeo 4043D (MFR: 6 g/10 min (190° C., 2.16 kg), density: 1.24 g/cm$^3$ according to technical data sheet), D isomer content of 3.5 wt.-%, commercially available from NatureWorks, USA P2: PBAT BASF ecoflex F Blend C1200 (MVR: 2.5-4.5 ml/10 min (190° C., 2.16 kg); MFR: 2.7-4.9 g/10 min (190° C., 2.16 kg), density: 1.25-1.27 g/cm$^3$ according to technical data sheet), commercially available from BASF SE, Germany

3 EXAMPLES

Example 1—Preparation of Compounds (CO)

The Formulations containing 43 wt.-% calcium carbonate CC1 or CC2 were continuously compounded on a Maris™ 20 Hi-Tech lab twin screw extruder with an Econ EW10 underwater pelletizer. The polymers were dried in desiccant based column lab dryers from Motan GmbH at 70° C. for 6 hours. The polymer resins were fed to the main hopper via a loss in weight feeders, another two loss in weight feeders were feeding two side feeders stuffing the carbonates into the extruder barrel. The split of the carbonates was 50:50. The screw speed was 800 rpm. The intake zone was at 15° C. The temperature of the first barrel was 170° C. and 180° C. for the following barrels and the die. The die plate had 2 holes, knife speed was 600 rpm and the cooling water was at 34° C. After 2 hours at ambient temperature the compounded pellets of the polymer composition were put in a sealed plastic bag. The compositions and filler contents of the prepared compounds are compiled in Table 1 below. The precise filler content was determined by the ash content. The results are reported in Table 1.

The tensile E-modulus of the biodegradeable polymers or polymer blends was measured on (unstretched) cast sheets according to ISO 527-3. The cast sheets were prepared on a Collin Laboratory Film Line (Dr. Collin GmbH, Germany) with a single screw extruder with a diameter of 30 mm. If the polymer blend comprised more than one biodegradeable polymers, the polymers were preblended with a tumbling mixer from Engelsman AG. The biodegradable polymers were then fed into the hopper of the extruder. The sheets were extruded with a 300 mm wide slot die and a take-up system, which had temperature controlled rolls. The slot die had an opening of 230 μm. The distance from the slot die to the gap of the first 2 cooling rolls was 20 mm. The gap between these rolls was 200 μm. The rolls were kept at appropriate low temperature to cool down the melt and form a sheet. In the examples 60° C. adjusted. The screw speed was adjusted to fill the gap without creating a melt bank. By that 200 μm thick sheets with low orientation were extruded. The extruder and die temperatures were consistent throughout the experiment. The die and barrel temperature was set at 190° C., other polymers may need different temperatures according the recommendation of the supplier. The line speed was 0.5 m/min. The tensile E-modulus was measured from samples in machine direction. Tensile E-modulus determination of the sheets was performed according to ISO 527-3. The sheet specimen width was of 15 mm and the testing length was 5 cm. The E-modulus corresponded to the inclination of the tensile test curve between the points at 0.02% and 2% elongation. The results are reported in Table 1.

TABLE 1

Compositions and properties of prepared compounds.

| Compound | Filler | P1 [wt.-%] | P2 [wt.-%] | Ash content [wt.-%] | Tensile E-modulus of polymer or polymer blends [MPa] |
|---|---|---|---|---|---|
| CO1 (comparative) | CC1 | 57 | — | 42.5 | 3200 |
| CO2 (inventive) | CC1 | 34.2 | 22.8 | 42.1 | 2000 |
| CO3 (inventive) | CC1 | 22.8 | 34.2 | 41.8 | 1350 |
| CO4 (inventive) | CC1 | 11.8 | 45.6 | 41.6 | 600 |
| CO5 (inventive) | CC1 | — | 57 | 41.4 | 40 |
| CO6 (comparative) | CC2 | 57 | — | 40.4 | 3200 |

The results shown in Table 1 confirm that compounds with good quality could be produced.

Example 2—Preparation of Breathable Films

Breathable films were produced with a pilot-extrusion cast-film line with integrated MDO-II unit (Dr. Collin GmbH, Germany) the extruder temperature settings were 175° C.-185° C.-200° C.-200° C.-200° C. for the barrels and 210° C. for the die. The rotation speed of the extruder was 35 rpm. Compounds of Example 1 were used to produce the stretched breathable films. All compounds were again dried at 70° C. for 6 hours. The initial film speed of the cast roll was at 5 m/min. The cast roll temperature was at 45° C. The speed difference in % between the two rolls at each of the two stretching gaps units was increased until a homogeneous stretched and uniform film was achieved. The stretching settings are given in table 2. The preheating roll was at 55° C. the slow and fast draw rolls were at 70° C., the annealing rolls were at 50° C.

The film quality of the obtained breathable films was inspected visually and the films were tested regarding their water vapour transmission rate (WVTR) and their hydrostatic pressure. The results are shown in Table 2 below.

TABLE 2

Compositions and properties of prepared breathable films.

| Sample | Stretching settings gap1/gap2 | Compound | Basis weight [g/m$^2$] | Film quality | WVTR [g/(m$^2$ × day)] | Hydro-static pressure [mbar] | Noise | Noise level [dBA] |
|---|---|---|---|---|---|---|---|---|
| 1 (comparative) | 70%/70% | CO1 | 28.6 | ok | 1243 | 746 | 6 | 66.6 |
| 2 (inventive) | 70%/70% | CO2 | 28.6 | ok | 1078 | 408 | 5 | 59.8 |
| 3 (inventive) | 70%/70% | CO3 | 31.4 | ok | 804 | 442 | 4 | 56.7 |
| 4 (inventive) | 70%/70% | CO4 | 31.9 | ok | 1342 | 293 | 3 | 51.3 |
| 5 (inventive) | 70%/70% | CO5 | 33.5 | ok | 1024 | 336 | 3 | 45.3 |
| 6 (comparative) | 70%/70% | CO6 | 29.9 | ok | 1214 | 616 | 6 | 63.0 |
| 7 (comparative) | 60%/60% | CO6 | 36.4 | ok | 1212 | >1000 | 7 | nm* |

*nm = not measured

The results shown in Table 2 confirm that the breathable films have good quality and membrane properties. Samples 1, 2, 6 and 7 created rather unpleasant noise when folding the films. In applications like in back sheets for baby diapers this is an important criteria as such noise is created every time the baby is moving. Therefore these samples would not be accepted by consumers in such applications. Samples 3, 4 and 5 show that by increasing the content of the polymer P2 the noise level can be reduced significantly to a much more pleasant noise and would allow the application in diaper back sheets and other noise sensitive applications.

The mechanical properties, such as the force at break, E-modulus as well as the elongation at break in machine and cross direction, of the obtained breathable films are outlined in Tables 3 and 4. The results prove that the mechanical properties are on a good level for most hygiene film applications.

TABLE 3

Compositions and mechanical properties of prepared breathable films. Film samples taken in machine direction (MD).

| Sample | Compound | Force at break [N] - MD | E-modulus [MPa] - MD | Max. Elongation at break [%] - MD |
|---|---|---|---|---|
| 1(comparative) | CO1 | 29.5 | 1730 | 23.5 |
| 2 (inventive) | CO2 | 24.5 | 1330 | 31.4 |
| 3 (inventive) | CO3 | 23.8 | 1110 | 43.5 |
| 4 (inventive) | CO4 | 21.1 | 741 | 55.9 |
| 5 (inventive) | CO5 | 14.2 | 196 | 115.8 |
| 6 (comparative) | CO6 | 28.5 | 1980 | 26.5 |
| 7 (comparative) | CO6 | 37.9 | 2330 | 7.9 |

TABLE 4

Compositions and mechanical properties of prepared breathable films. Film samples taken in cross direction (CD).

| Sample | Compound | Force at break [N] - CD | E-modulus [MPa] - CD | Max. Elongation at break [%] - CD |
|---|---|---|---|---|
| 1 (comparative) | CO1 | 5.8 | 500 | 15.2 |
| 2 (inventive) | CO2 | 4.1 | 405 | 23.9 |
| 3 (inventive) | CO3 | 3.7 | 363 | 48 |
| 4 (inventive) | CO4 | 3.2 | 230 | 318.5 |
| 5 (inventive) | CO5 | 4.0 | 126 | 537.5 |
| 6 (comparative) | CO6 | 4.8 | 459 | 9.8 |
| 7(comparative) | CO6 | 6.1 | 561 | 11.3 |

The invention claimed is:

1. A breathable film comprising at least one biodegradable polymer and from 35 to 65 wt.-%, based on the total weight of the breathable film, of a surface-treated filler material product, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 m$^2$/g, as measured using nitrogen and the BET method according to ISO 9277, and a residual total moisture content in the range from 0.05 to 0.3 wt.-%, based on the total dry weight of the at least one ground calcium carbonate-comprising filler material, and B) a treatment layer on the surface of the at least one ground calcium carbonate-comprising filler material comprising i. at least one mono-substituted succinic anhydride consisting of succinic anhydride mono-substituted with a group selected from any linear, branched, aliphatic and cyclic group having a total amount of carbon atoms from C2 to C30 in the substituent and/or salts of the at least one mono-substituted succinic anhydride, and/or ii. at least one saturated or unsaturated aliphatic linear or branched carboxylic acid and/or salts thereof, wherein the surface-treated filler material product comprises the treatment layer in an amount of from 0.1 to 3 wt.-%, based on the total dry weight of the at least one ground calcium carbonate-comprising filler material, and wherein the at least one biodegradable polymer has a tensile E-modulus, measured according to ISO 527-3, of below 2,100 MPa.

2. The breathable film of claim 1, wherein the at least one saturated or unsaturated aliphatic linear or branched carboxylic acid and/or salts thereof comprises at least one aliphatic carboxylic acid having a total amount of carbon atoms from C4 to C24 and/or a salt thereof.

3. The breathable film of claim 1, wherein the at least one ground calcium carbonate-comprising filler material is a wet ground calcium carbonate-comprising filler material.

4. The breathable film of claim 1, wherein the at least one biodegradable polymer is selected from the group consisting of polylactic acid, polylactic acid-based polymer, polyhydroxyalkanoates (PHA), polyhydroxybutyrate (PHB), poly-3-hydroxybutyrate (P3HB), polyhydroxyvalerate, polyhydroxybutyrate-polyhydroxyvalerate copolymer, poly (3-hydroxybutyrate-co-3-hydroxyvalerate), polybutyrate-adipate-terephthalate (PBAT), polyglyconate, poly (dioxanone), polybutylene succinate (PBS), polycaprolactone (PCL), polycaprolactone-poly (ethylene glycol) copolymer, polycaprolactone-polylactic acid copolymer, polyvinylalcohol (PVA), poly (ethylene succinate) (PES), poly (propylene succinate) (PPS), and mixtures thereof.

5. The breathable film of claim 1, wherein the at least one biodegradable polymer is selected from the group consisting of polylactic acid, polylactic acid-based polymer, polybutyrate-adipate-terephthalate (PBAT), and mixtures thereof.

6. The breathable film of claim 1, wherein the at least one biodegradable polymer is a blend of polybutyrate-adipate-terephthalate (PBAT) and polylactic acid.

7. The breathable film of claim 1, wherein the at least one biodegradable polymer is a blend of polybutyrate-adipate-terephthalate (PBAT) and polylactic acid with a weight ratio ranging from 10:1 to 1:9.

8. The breathable film of claim 1, wherein the breathable film comprises the surface-treated filler material product in an amount from 40 to 65 wt.-%, based on the total weight of the breathable film.

9. The breathable film of claim 1, wherein the breathable film comprises the surface-treated filler material product in an amount from 40 to 60 wt.-%, based on the total weight of the breathable film.

10. The breathable film of claim 1, wherein the at least one ground calcium carbonate-comprising filler material is natural ground calcium carbonate, precipitated calcium carbonate, modified calcium carbonate, surface-treated calcium carbonate, or a mixture thereof.

11. The breathable film of claim 1, wherein the at least one ground calcium carbonate-comprising filler material is natural ground calcium carbonate.

12. The breathable film of claim 1, wherein the at least one ground calcium carbonate-comprising filler material has a) a weight median particle size $d_{50}$ from 0.25 μm to 5 μm, and/or b) a top cut particle size $d_{98}$ of ≤12.5 μm, and/or c) a fineness such that at least 5 wt.-% of all particles have a particle size of <0.5 μm, and/or d) a specific surface area (BET) of from 0.5 to 50 $m^2/g$, as measured using nitrogen and the BET method according to ISO 9277.

13. The breathable film of claim 1, wherein the at least one ground calcium carbonate-comprising filler material has a) a weight median particle size $d_{50}$ from 0.6 μm to 2 μm, and/or b) a top cut particle size $d_{98}$ of ≤6.5 μm, and/or c) a fineness such that at least 9 wt.-% of all particles have a particle size of <0.5 μm, and/or d) a specific surface area (BET) of from 0.5 to 15 $m^2/g$, as measured using nitrogen and the BET method according to ISO 9277.

14. The breathable film of claim 1, wherein the at least one ground calcium carbonate-comprising filler material has a fineness such that at least 11 wt.-% of all particles have a particle size of <0.5 μm.

15. The breathable film of claim 1, wherein the at least one ground calcium carbonate-comprising filler material has a residual total moisture content of from 0.05 to 0.2 wt.-%, based on the total dry weight of the at least one ground calcium carbonate-comprising filler material.

16. The breathable film of claim 1, wherein the at least one ground calcium carbonate-comprising filler material has a residual total moisture content of from 0.05 to 0.12 wt.-%, based on the total dry weight of the at least one ground calcium carbonate-comprising filler material.

17. The breathable film of claim 1, wherein the treatment layer on the surface of the at least one ground calcium carbonate-comprising filler material comprises at least one mono-substituted succinic anhydride consisting of succinic anhydride mono-substituted with a group selected from a linear, branched, aliphatic and cyclic group having a total amount of carbon atoms from C4 to C18 in the substituent and/or salts of the at least one mono-substituted succinic anhydride.

18. The breathable film of claim 1, wherein the surface-treated filler material product has a moisture pick-up from 0.1 to 1 mg/g, at a temperature of 23° C. ±2° C.

19. The breathable film of claim 1, wherein the surface-treated filler material product has a moisture pick-up from 0.2 to 0.8 mg/g, at a temperature of 23° C.

20. The breathable film of claim 1, wherein the film has a basis weight from 8 to 40 $g/m^2$.

21. The breathable film of claim 1, wherein the film has a basis weight from 20 to 36 $g/m^2$.

22. A process for producing a breathable film comprising at least one biodegradable polymer and from 35 to 65 wt.-%, based on the total weight of the breathable film, of a surface-treated filler material product, the process comprising the steps of:

a) providing a composition comprising at least one biodegradable polymer and from 35 to 65 wt.-%, based on the total weight of the composition, of a surface-treated filler material product, wherein the at least one biodegradable polymer has a tensile E-modulus, measured according to ISO 527-3, of below 2,100 MPa, and b) forming a film from the composition of step a), and c) stretching the film obtained in step b) into at least one direction, wherein the surface-treated filler material product comprises A) at least one ground calcium carbonate-comprising filler material having a weight median particle size $d_{50}$ in the range from 0.1 μm to 7 μm, a top cut particle size $d_{98}$ of ≤15 μm, a specific surface area (BET) from 0.5 to 150 $m^2/g$, as measured using nitrogen and the BET method according to ISO 9277, and a residual total moisture content in the range from 0.05 to 0.3 wt.-%, based on the total dry weight of the at least one ground calcium carbonate-comprising filler material, and B) a treatment layer on the surface of the at least one ground calcium carbonate-comprising filler material comprising i. at least one mono-substituted succinic anhydride consisting of succinic anhydride mono-substituted with a group selected from any linear, branched, aliphatic and cyclic group having a total amount of carbon atoms from C2 to C30 in the substituent and/or salts of the at least one mono-substituted succinic anhydride, and/or ii. at least one saturated or unsaturated aliphatic linear or branched carboxylic acid and/or salts thereof, wherein the surface-treated filler material product comprises the treatment layer in an amount of from 0.1 to 3 wt.-%, based on the total dry weight of the at least one ground calcium carbonate-comprising filler material.

23. The process of claim 22, wherein the at least one saturated or unsaturated aliphatic linear or branched carboxylic acid and/or salts thereof comprises at least one aliphatic carboxylic acid having a total amount of carbon atoms from C4 to C24 and/or a salt thereof.

24. The process of claim 22, wherein the composition provided in step a) is a masterbatch or a compound obtained by mixing and/or kneading the at least one biodegradable polymer and the surface-treated filler material product to form a mixture and continuously pelletizing the obtained mixture.

25. An article comprising the breathable film according to claim 1 wherein the article is selected from the group consisting of hygiene products, medical products, healthcare products, filter products, geotextile products, agriculture products, horticulture products, clothing, footwear products, baggage products, household products, industrial products, packaging products, building products, and construction products.

* * * * *